Patented Feb. 22, 1927.

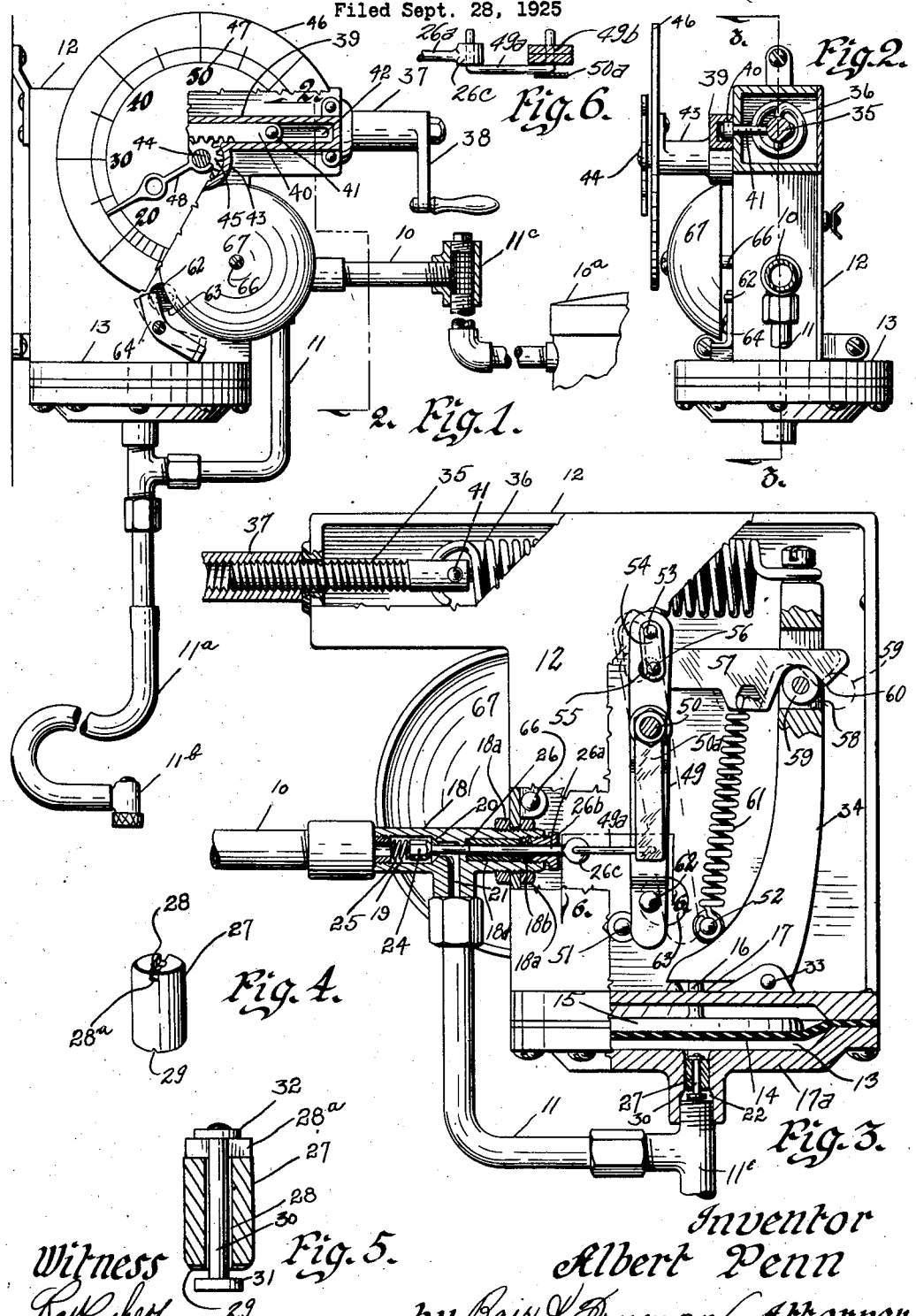

1,618,953

UNITED STATES PATENT OFFICE.

ALBERT PENN, OF DES MOINES, IOWA, ASSIGNOR OF ONE-HALF TO RALPH PENN, OF DES MOINES, IOWA.

AIR-SERVICE DEVICE.     REISSUED

Application filed September 28, 1925. Serial No. 59,200.

The object of my invention is to provide a simple mechanism whereby air may be taken from a source of compressed air supply and delivered to a member adapted to be filled or inflated up to a predetermined pressure therein, which device is capable of being set for filling or inflating such receptacle to a desired predetermined pressure and will automatically cease to operate when such pressure in the receptacle has been reached, which device uses a single service hose or the like for each receptacle to be filled.

I will explain and describe my device as applied to air service equipment for filling pneumatic tires.

As so applied, it is more particularly my object to provide such a device which can be readily set for supplying air to a tire from a pressure source to inflate the tire to a predetermined lower pressure, and which when so set and operated will automatically cease supplying the air to the tire when the predetermined pressure therein has been reached.

An additional purpose is to provide such a device, which will indicate to the user the beginning of the inflating operation, the continuation thereof and the ceasing of the operation.

Still a further object is to provide a mechanism, which will accomplish the foregoing objects and complete the tire inflation in the shortest possible time.

A further purpose of my invention is to provide such an air service device, which can be assembled in connection with the ordinary equipment of an air service station, interposed between the source of air supply and the ordinary single service hose, and which will then accomplish all the foregoing objects.

With these and other objects in view, my invention consists in the construction, arrangement and combination of the various parts of my air service device, whereby the objects contemplated are attained, as hereinafter more fully set forth, pointed out in my claims and illustrated in the accompanying drawings, in which:

Figure 1 shows a front elevation of a device embodying my invention.

Figure 2 is a detail, sectional view taken on the line 2—2 of Figure 1.

Figure 3 is a detail, sectional view through the valve and operating structure, taken on the line 3—3 of Figure 2.

Figure 4 is a perspective view of part of the choker device for the diaphragm chamber.

Figure 5 is a sectional view of the choker; and

Figure 6 is a detail, sectional view taken on the line 6—6 of Figure 3.

At service stations for supplying air to pneumatic tires, it is highly desirable to have a mechanism which can be set for inflating tires to a desired pressure, and which will automatically shut off any further supply when the desired pressure has been reached.

I have therefore provided a mechanical, automatic air service device, which can be manufactured as a unit and interposed in the air service line including a valve in the air service line actuated towards closing movement by air pressure and preferably also by a spring, a diaphragm subject to the pressure on the service hose side of the valve, an operating mechanism actuated by the diaphragm in one direction for permitting the closing of the valve and by adjustable means capable of being set for different pressures in the other direction for opening the valve, and means for choking the air-flow to but not from the diaphragm chamber, means for setting the device for filling a tire to a predetermined pressure, means for indicating the pressure for which the device is set, and means for indicating the start, continuance and stopping of a filling operation.

I will first describe the structure of the mechanism as assembled as a part of an air service equipment and will then explain the operation and the advantages thereof.

In the ordinary air service station equipment, there is provided a receiver or tank $10^a$ for compressed air, a pipe 10 for conducting air from the tank or receiver, and a flexible service hose $11^a$ having at its discharge end an ordinary valve-controlled chuck $11^b$.

I do not here describe the construction of the chuck in detail, since it is a well-known structure.

For convenience, I place a dust strainer $11^c$ in the pipe 10 between the receiver $10^a$ and my improved mechanism.

My mechanism is interposed in the air service line between the strainer 11ᶜ and the service hose 11ᵃ.

My device is provided with a casing 12, which encloses part of the operating mechanism and furnishes a support for other parts.

Extending through one wall of the casing 12 is a valve casing 18, which is adjustably mounted in the wall of the casing 12 by means of nuts 18ᵃ screwed onto the casing 18 on opposite sides of the wall of the casing 12.

One end of the valve casing 18 is connected with the pipe 10, as clearly shown in Figure 3.

In the casing 18 is a passage 19 having the valve seat 20 and communicating by means of a lateral passage 21 with the tube 11. In the passage 19 is mounted the valve 24 adapted to cooperate with the valve seat 20, having the stem 26 slidably mounted in a guide opening in the wall of the casing 18. A spring 25 tends to hold the valve 24 seated.

At one end of the casing 12 is a diaphragm chamber 13 in which is arranged a diaphragm 14 against which rests a plate 15.

A pin 16 projects from the plate 15 slidably through the inner wall 17 of the diaphragm chamber as shown in Figure 3. A fitting 11ᵉ, preferably of the T type communicates with the tube 11 and with the by-pass 22 extending through the outer wall 17ᵃ of the diaphragm chamber 13 and also with the service hose 11ᵃ.

It will be obvious that when the valve 24 is open, air may pass from the pipe 10 through the casing 18 and the tube 11 and the fitting 11ᵉ to the service hose 11ᵃ and also through the by-pass 22 to the diaphragm chamber 13.

At the end of the casing 18, which is mounted in the wall of the casing 12, is a filler sleeve 18ᵈ and packing 18ᵇ. A packing nut 26ᵇ is screwed into the end of the casing 18 inside the casing 12.

Extending through the packing nut, the packing and into the sleeve 18ᵈ in alignment with the stem 26 is a plunger 26ᵃ, having the perforated end 26ᶜ.

In the passage 22 is mounted a choker 27 having a passage 28 extending through it as shown in Figure 5. The passage 28 at one end communicates with a transverse groove 28ᵃ in the end of the choker 27. A similar but much smaller groove 29 is provided in the other end of the choker 27 and communicates with the passage 28.

Extending loosely through the passage 28 is a pin or the like 30 having on one end a head 31, adapted when the pin is raised to close the outer end of the passage 28, except for the groove 29, and having on its other end a head 32.

This choker device is of importance for the reason that when air is flowing from the pipe 22 into the diaphragm chamber, the passage 28 is restricted by the head 31 of the pin 30 to the amount of air which can pass through the groove 29. On the other hand, the groove 28ᵃ is of such size that the flow of air out of the diaphragm chamber is not restricted by the head 32.

Thus air will more quickly flow from the diaphragm chamber than it flows into it. The advantage of this arrangement will hereinafter more fully appear. Any other suitable device for changing the rate of flow of air to and from the diaphragm chamber may be used.

I will now describe the mechanism for controlling the flow of air past the valve 24.

Pivoted in the casing 12 as at 33, is a lever 34, one end of which is adapted to coact with the pin or plunger 16, so that when the diaphragm 14 is moved upwardly from its position shown in Figure 3 (to-wit toward the lever 34), the lever 34 is actuated for movement in one direction.

A screw bolt 35 is slidably extended through the wall of the casing 12. A coil spring 36 is connected with the screw bolt 35 and the lever 34, as shown in Figure 3, for tending to actuate the lever 34 in the other direction.

Means are provided for regulating the tension on the spring 36 for adjusting the device to supply the desired pressure to the tire, thereby determining the pressure to be so supplied.

On the end of the screw bolt 35 outside the casing 12 is mounted a tubular screw-threaded sleeve 37 on which is a crank handle 38.

It will be seen by screwing the sleeve 37 against the casing 12 in one direction, the tension of the spring 36 will be increased, while by rotating the sleeve 37 in the opposite direction, the tension of the spring 36 will be decreased.

Means are also provided for visibly indicating the pressure, for which the device is adjusted.

Mounted on the casing 12 is a guide casing 39 in which travels a rack bar 40. (See Figures 1 and 2.)

A pin 41 extends from the screw bolt 35 through a slot 42 in the wall of the casing 12 and connects with the rack bar 40, so that the longitudinal movement of the screw bolt 35 imparts movement to the rack bar 40.

Supported on, and in the present instance shown to be made integral with the casing 39 is a projecting casing 43, which carries a shaft 44. (See Figures 1 and 2.)

On the inner end of the shaft 44 is a pinion 45, which meshes with the rack bar 40. Supported on the outer end of the casing 43 is a dial or the like 46, having suitable indicating characters 47 thereon, to indicate various numbers of pounds of pressure.

On the outer end of the shaft 44 is an indicating finger 48.

The parts are so arranged that the finger 48 will move to positions adjacent to the proper indicating characters 47 for showing the pressure to which the device is adjusted to inflate the tire.

Pivotally mounted in the casing 12 is a lever or the like 49, mounted on the pivot 50 and having the limits of its movement on its pivot fixed by means of stop pins 51 and 52. (See Figure 3.)

One end of the lever 49 is designed to coact with the end of the stem 26 through the following described mechanism. A U-shaped piece of wire 49ª has one end inserted through the lever 49 and the other end inserted through the perforated end 26ᶜ of the plunger 26ª, thereby forming an operative connecting link between the plunger 26ª and the lever 49. The link 49ª is held against accidental separation from the lever 49 by a strip of spring material 50ª fastened to the lever 49.

Pivoted to the other end of the lever 49, as at 53, are links 54. In the lever 49 is a hole 55. A pin 56 of substantially smaller diameter than the hole 55 projects through the hole, the walls of which thus serve as stops for limiting the pivotal movement of the links 54. The pin 56 is pivoted to an arm 57, which is extended through a slot 58 in the lever 34.

In the slot 58 is mounted a roller 59. The arm 57 has a V-shaped point 60 arranged to coact with the roller 59.

A spring 61 is secured to the arm 57 and to the stop pin 52 for yieldingly holding the arm 57 in engagement with the roller 59, and also for actuating the arm 57 lengthwise as provided for by the structure and mounting of the links 54 as hereinafter described.

A pin 62 extends from the lever 49 through a hole 63 in the wall of the casing 12. A striker arm 64 is pivoted on the casing 12 and at one end forms a bell tapper. This end tends to drop by gravity till it rests away from contact with the bell as for instance on the diaphragm casing as shown by full lines in Figure 1.

Mounted on a post 66 on the casing 12 is a bell 67.

I will now describe the operation of my improved air service device applied as a tire inflator.

Assuming that it is desired to put sixty pounds of air into the tire, the operator turns the crank 38 for rotating the screw-threaded sleeve 37 on the screw bolt 35. The pin 41 actuates the rack bar 40 for thereby rotating the pinion 45 and moving the indicating finger 48 around the face of the dial to the characters thereon indicating sixty pounds.

The parts are so adjusted that the tension of the spring 36 will then be such that it will require sixty pounds pressure on the diaphragm 14 to overcome the tension of the spring 36, and consequently, as will more fully appear, when sixty pounds pressure has been placed in the tire, the dispensing valve 24 is closed.

It is entirely practical and customary for receivers, for instance, such as 10ª, to be regularly supplied with air pressure considerably higher than the maximum pressure to which it is desired to inflate any tire. Such higher pressure in the receiver is necessary for the proper operation of this device.

It will be understood that before the device is assembled in the final installation, the spring 36 will have been put under some tension, and when under tension, the lever 34 will stand in its full line position as shown in Figure 3, for holding the valve 24 open. When the tube 10 is connected with the receiver 10ª, the receiver pressure is built up in the tube 11ª, closed by the chuck 11ᵇ. This pressure also passes slowly through the choker 27, into the diaphragm chamber and being higher than the maximum tension which is ever applied to the spring 36 will actuate the lever 34, moving it until the roller 59 stands in its dotted line position, shown in Figure 3. This action of the lever 34, as hereinafter more fully explained, serves to permit the lever 49 to move the plunger 26ª away from the stem 26 and permitting the spring 25 to close the valve 24. The device is now ready for use.

The valve 24 being closed, when the chuck is placed over the valve stem of the automobile tire and air passes out through the pipe 11 and the service hose 11ª, the pressure in the hose 11ª and in the pipe 11 and in the diaphragm chamber 14 will be reduced, whereupon the spring 36 will actuate the lever 34 for moving it to its position shown in Figure 3. It is, of course, assumed that the pressure in the tire to be filled is below the sixty pounds for which the device has been set.

When the roller 59 passes over the point 60, the spring 61 will cause the left-hand beveled face of the point 60 to travel along the roller 59 for moving the arm 57 to the right. This will cause the link 54 to swing until the pin 56 engages the wall of the hole 55 and then to move the lever 49 on its pivot 50 from its dotted line position shown in Figure 3 to its full line position shown in that figure.

The movement of the lever 49 thus described causes the plunger 26ª to engage the stem 26 for unseating the valve 24 against the air pressure and the pressure of the spring 25. When the valve 24 is opened, compressed air passes from the pipe 10 to the valve casing 18 and to the pipe 11 and the tube 11ª, and through the groove 29 and the passage 28 to the diaphragm chamber.

The sizes and arrangements and mounting of the parts are such as to provide air passages sufficiently large that when the valve 24 is opened, the full pressure of the receiver or source of air supply is admitted to the hose 11ª, and is maintained in spite of the discharge into the tube and diaphragm chamber. This pressure is admitted to the diaphragm chamber more slowly on account of the reduced passage 29 and approximately one to two pounds is supplied to the tire before the diaphragm pressure becomes great enough to cause the diaphragm to actuate the lever 34, moving it from its position shown in Figure 3 toward the right against the tension of the spring 36, until the roller 59 travels over the point 60 and again closes the valve 24.

When the arm 49, moves to the dotted line position, allowing the valve 24 to close, the pin 62 strikes the upper end of the arm 64, so that the tapper end strikes the bell and then moves away and stands slightly spaced from it, as shown by dotted lines in Figure 1. Thus the bell is tapped every time the valve is closed.

With the valve 24 again closed, the pressure in the tubes 11ª and 11ᵇ and in the diaphragm chamber 13 equalizes with the pressure in the tire and if this pressure is still lower than that for which the device is set, in this instance sixty pounds, as indicated by the needle 48 and the numerals 47, the spring 36 will again actuate the lever 34, moving it to the left until the roller 59 passes across the point 60, and the valve 24 is again opened as previously described and a new cycle of operations ensues.

These cycles of operations follow one another in rapid succession at the rate of approximately one per second, until enough air has been supplied to the tire so that when the valve 24 is closed and the pressure in the tubes 11ª, 11ᵇ and the diaphragm chamber 13 equalizes with the tire, it will still be high enough that the spring 36 can no longer actuate the lever 34 against the pressure on the diaphragm 14, whereupon the operations cease. The valve 24 remains closed and no more air is admitted from the receiver and the tapping of the bell also ceases, indicating to the user that the tire pressure has reached the point at which the indicator 48 is set.

In this connection, it will be remembeed that the spring 61 is so arranged that it tends not only to hold the arm 57 in engagement with the roller 59, but also to move the arm 57 slightly to the left.

Owing to the pressure of the spring 25 and the action of the air on both valve 24 and the plunger 26ª, the valve 24 is being urged to seat before the roller 59 passes the point 60. Should this occur, it would be possible for the point 60 to assume a balanced position on the roller 59 and thus cause the action of the lever 49 to become uncertain and not positive. To avoid this possibility, is the further function of the parts 54, 55, 56, 57 and 61 whose action I will now describe.

It will be noted that with the links 54, I have provided a quick action device. By providing the links 54 mounted as shown, that is with the lower end at an acute angle to the line of the spring 61, it will be obvious that the spring 61 tends to move the arm 57 towards the left.

This arrangement of the parts in connection with the lost motion mounting of the links 54 prevents any possible balancing or fluttering of the parts with the point 60 on the radial line of the roller 59 and insures a positive action of the lever 49 in each case.

When the valve 24 is opened, compressed air passes from the pipe 10 to the valve casing 18 and to the pipe 11 and the tube 11ª and through the groove 29 and the passage 28 to the diaphragm chamber.

If it were not for the lost motion connection of the links 54, the roller might assume a dead center position over the V point 60, so that the arm 57 and the lever 49 would not be actuated positively in either direction. Under this condition, the valve 24 might close for the reasons given above, and with the pressure thus shut off, the roller never would clear the point 60.

However, on account of the angle of the links 54, with the lost motion connection at 55, the point 60 can never reach such a balanced or centered position. Before the point 60 reaches a centered position on the roller 59, the arm 57 is thrown to the left, the distance permitted by the lost motion connection at 55, which distance is of such magnitude that the point 60 is always carried past center on the roller 59 and the right hand angle face then positively actuates the arm 57 and thereby the lever 49, moving them to the limit in the opposite direction. This construction and resulting action entirely eliminates the undesirable results just mentioned.

It thus appears that when the device is not in use and the valve in the chuck 11ᵇ is closed, air will flow into the service hole 11ª until the pressure against the diaphragm is greater than necessary to overcome the tension of the spring 36, so that the lever 34 will be actuated to move to position for permitting the valve 24 to close. So long as the pressure remains up in the service hose, the device will remain inoperative.

When the chuck is placed over the valve stem, the pressure in the air line on the service hose side of the valve 24 will be reduced, thus permitting the spring 36 to actuate the lever 54 for causing the trip mechanism to move to position for opening the valve 24.

In this connection, it may be said that when air in a single service hose is used and a device of this kind is interposed in the air line and is set for delivering a certain pressure in the tire, it is necessary that the device be partially actuated according to the pressure in the tire. This is accomplished by providing a mechanism which frequently closes the control valve 24 and permits the pressure in the service hose, the tire and the diaphragm chamber to be equalized, so that if the pressure in the tire is then below the pressure required to actuate the diaphragm and the lever 34 for moving the latter to position permitting the valve 24 to close, the lever 34 will be actuated for opening the valve and allowing flow from the receiver 10ª to the tire.

It will be understood that either the passage through the chuck 11ᵇ or the passage into the tire or other article receiving air must be restricted as compared to the passages conducting the air through this point from the receiver 10ᵉ, so that a substantially higher pressure approximating the receiver pressure is always built up in these passages and consequently in the diaphragm chamber.

Thus in the operation of the machine, the air is delivered to the tire in charges and the valve 24 is successively opened and closed.

After the delivery of each charge to the tire, the mechanism is actuated to close the valve, whereupon it becomes subjected to a pressure which is substantially that in the tire. If that pressure is great enough to overcome the spring pressure, the valve 24 remains closed, but if it is not great enough, the cycle of operation continues.

There are devices which can be set for inflating tires to a predetermined pressure automatically, but with all of such devices of which I am aware, a draw-back is encountered in that the latter part of the filling operation is extremely slow.

Such devices do not admit the high pressure of the receiver or other air source to the hose leading to the tire, but instead admit only the pressure to which the tire is to be inflated. Consequently the pressure differential between the hose and tire approaches zero as the tire nears the desired pressure with the result that the latter part of the filling operation is too slow.

It has, therefore, been my purpose to provide a device by which the entire filling operation is rapid and the latter part of the filling operation is accomplished without this slowing down effect.

With my device when the valve 24 is open, the flow of air through the service hose is subject to the full receiver pressure and this is true practically through the entire cycle of operations until the tire is filled and there is no slowing down of the latter part of the filling operation, such as occurs where an automatic device of the reducing valve type is employed.

I have therefore provided a device which may be used with a single service hose, which may be set to accurately fill the tire to a predetermined pressure and which will cease operation when that pressure has been reached in the tire.

The pressure for which the device is set is visibly indicated on the dial and the continuance of the operation of the device is indicated by the bell.

It is obvious that changes may be made in the details of the construction and operation of my improved air service device without departing from the essential features and purposes of my invention, and it is my intention to cover by my claims any modified forms of structure or use of mechanical equivalents, which may be reasonably included within their scope.

I claim:

1. In a device of the class described, an air service line having a valve controlled portion, and means for discharging air in successive charges when said valve is opened, comprising a valve in the air service line, a lever, means for subjecting the lever to pressure in the air line between valves, and an independent mechanism actuated from the lever for actuating the second valve.

2. In a device of the class described, an air service line having a valve-controlled portion, and means for discharging air in successive charges when said valve is opened, comprising a valve in the air service line, a lever, means for subjecting the lever to pressure in the air line between the second valve and the first valve, and an independent mechanism actuated from the lever for actuating the second valve, means for actuating the lever against the air pressure thereon, said device being adapted to close the second valve when the air pressure on the lever is increased above the pressure of the last described means, and means for retarding the action of air pressure on the lever, for actuating it in the direction for closing the second valve.

3. In a device of the class described, an air service line having a valve controlled portion, and means for discharging air in successive charges when said valve is opened, comprising a second valve in the air service line, a lever, means for subjecting the lever to pressure in the air line between the valves, a trip device interposed between the lever and the second valve for imparting movement from the lever to the second valve, and means for acting on the lever in resistance to the air pressure thereon.

4. In an air service device, a pipe line for supplying compressed air from a source to a place of use, a valve in said pipe line, means for intermittently allowing said valve to close and for intermittently causing said valve to open independently of the back pressure below a certain quantity, said means comprising a lever arranged to be actuated in one direction by pressure in the pipe structure between the valve and the discharge end thereof, means for actuating the lever in the other direction, and a trip mechanism interposed between the lever and the valve for quickly actuating the valve when the lever is moved in one direction for a certain distance.

5. In an air service device, a line for conducting compressed air, a valve therein, a second valve in said line, and means for successively opening and closing the second valve for supplying air therethrough in successive charges, when the first valve is opened, said means including a diaphragm chamber, a means connecting the chamber with the line between the valves, said means affording easy and rapid exhaust from the diaphragm chamber and restricted admission of air thereto, and means interposed between the diaphragm and the second valve for opening the second valve.

6. In a device of the class described, an air service line having a valve controlled portion, and means for discharging air in successive charges when said valve is opened, comprising a valve in the air service line, a lever, means for subjecting the lever to pressure in the air line between said valves, the service line having a passage to a pressure actuated member adapted to actuate the lever, a choker in the passage adapted to permit air to pass therethrough more freely in one direction than the other, a quick action device interposed between the lever and the second valve for imparting movement to the second valve, and means for acting on the lever in resistance to the air pressure thereon.

7. In a device of the class described, an air service line having a valve controlled portion, and means for discharging air in successive charges when said valve is opened, comprising a valve in the air service line, a lever, means for subjecting the lever to pressure in the air line between the valves including a pressure actuated member adapted to actuate the lever, a passage for connecting said member with the air service line, a choker in the passage adapted to permit air to pass therethrough more freely in one direction than the other, a quick action device interposed between the lever and the second valve for imparting movement to the second valve, and means for acting on the lever in resistance to the air pressure thereon, said second valve being constrained toward closing movement.

Des Moines, Iowa, September 26, 1925.

ALBERT PENN.